United States Patent
Mori et al.

(10) Patent No.: US 11,192,475 B2
(45) Date of Patent: Dec. 7, 2021

(54) REAR-FACING OCCUPANT PROTECTION DEVICE

(71) Applicant: TOYOTA JIDOSHA KABUSHIKI KAISHA, Toyota (JP)

(72) Inventors: Kazuya Mori, Okazaki (JP); Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 16/525,694

(22) Filed: Jul. 30, 2019

(65) Prior Publication Data

US 2020/0079254 A1 Mar. 12, 2020

(30) Foreign Application Priority Data

Sep. 12, 2018 (JP) .............................. JP2018-170902

(51) Int. Cl.
*B60N 2/427* (2006.01)
*B60R 21/055* (2006.01)
(Continued)

(52) U.S. Cl.
CPC ........ *B60N 2/42745* (2013.01); *B60R 21/055* (2013.01); *B60R 22/34* (2013.01); *B60R 2022/263* (2013.01)

(58) Field of Classification Search
CPC ........ B60R 2022/263; B60R 2022/266; B60R 21/055; B60N 2/4275; B60N 2/42709;
(Continued)

(56) References Cited

U.S. PATENT DOCUMENTS

| 4,468,051 A * | 8/1984 | Kobayashi | ............. | B60N 2/143 280/751 |
| 2015/0246627 A1* | 9/2015 | Shimizu | ................. | B60N 2/666 297/216.14 |

(Continued)

FOREIGN PATENT DOCUMENTS

| DE | 10066052 A1 | 7/2002 | |
| DE | 102007002185 A1 * | 7/2008 | ........... B60N 2/4279 |

(Continued)

OTHER PUBLICATIONS

U.S. Appl. No. 16/568,522, filed Sep. 12, 2019 in the name of Makoto Sekizuka.

*Primary Examiner* — Paul N Dickson
*Assistant Examiner* — Mary E Young
(74) *Attorney, Agent, or Firm* — Oliff PLC

(57) ABSTRACT

A rear-facing occupant protection device is provided. The rear-facing occupant protection device is applied to a vehicle in which a seatback of a front seat is mounted in a rear-facing state in which a back surface of the seatback faces a vehicle-body-side vertical wall portion disposed at a front end of a vehicle cabin, or mounted such that the seat back is capable of taking the rear-facing state. The rear-facing occupant protection device includes: an energy absorbing portion disposed on at least one of a back surface of a seatback pad of the seatback and a rear surface of the vehicle-body-side vertical wall portion, the energy absorbing portion being configured to be deformed so as to absorb energy at a time of a frontal collision of the vehicle.

12 Claims, 9 Drawing Sheets

(51) Int. Cl.
*B60R 22/34* (2006.01)
*B60R 22/26* (2006.01)

(58) Field of Classification Search
CPC ... B60N 2/4221; B60N 2/42736; B60N 2/143
See application file for complete search history.

(56) References Cited

U.S. PATENT DOCUMENTS

2016/0229319 A1* 8/2016 Fujita ..................... B60N 2/80
2019/0071051 A1* 3/2019 Board ..................... B60N 2/04
2020/0079253 A1* 3/2020 Wilson ................ B60N 2/0232

FOREIGN PATENT DOCUMENTS

| JP | S58-108941 U | 7/1983 |
| JP | H10-119616 A | 5/1998 |
| JP | 2005-247065 A | 9/2005 |
| JP | 2017-149331 A | 8/2017 |
| JP | 2017-149351 A | 8/2017 |
| JP | 2017-210173 A | 11/2017 |
| JP | 2018-052347 A | 4/2018 |

* cited by examiner

REAR-FACING OCCUPANT PROTECTION DEVICE

INCORPORATION BY REFERENCE

The disclosure of Japanese Patent Application No. 2018-170902 filed on Sep. 12, 2018 including the specification, drawings and abstract is incorporated herein by reference in its entirety.

BACKGROUND

1. Technical Field

The present disclosure relates to a rear-facing occupant protection device.

2. Description of Related Art

Techniques regarding vehicle seat devices are known see Japanese Patent Application Publication No. 2017-149331, Japanese Patent Application Publication No. 2017-149351, Japanese Patent Application Publication No. 2018-52347, Japanese Patent Application Publication No. 2017-210173). For example, the following JP 2017-149331 A discloses, in a vehicle in which two seats are aligned to face each other in a vehicle front-rear direction, a technology relating to a structure including a crossing air bag configured to be deployed so as to cross between the two seats aligned to face each other in the front-rear direction. In this related art, the crossing air bag intervenes between occupants sitting in the both seats at the time of a collision to reduce injury values of the occupants.

SUMMARY

However, there is room for improvement of sufficient absorption of kinetic energy caused when the rear-facing seated occupant inertially moves toward the front side of the vehicle at the time of a frontal collision.

The present disclosure provides a rear-facing occupant protection device capable of improving absorption of kinetic energy caused when a rear-facing seated occupant Menially moves toward the front side of the vehicle at the time of a frontal collision.

A first aspect of the disclosure provides a rear-facing occupant protection device applied to a vehicle in which a seatback of a front seat is mounted in a rear-facing state in which a back surface of the seatback faces a vehicle-body-side vertical wall portion disposed at a front end of a vehicle cabin, or mounted such that the seat back is capable of taking the rear-facing state, the rear-facing occupant protection device. The rear-facing occupant protection device includes: an energy absorbing portion disposed on at least one of a back surface of a seatback pad of the seatback and a rear surface of the vehicle-body-side vertical wall portion, the energy absorbing portion being configured to be deformed so as to absorb energy at a time of a frontal collision of the vehicle. A concept that "an energy absorbing portion is disposed on at least one" in the description that "an energy absorbing portion configured to be deformed so as to absorb energy at the time of a frontal collision is disposed on at least one" may include not only the case in which the energy absorbing portion is directly disposed on at least one, but also the case in which the energy absorbing portion is disposed via an intervention on at least one".

According to the above configuration, at the time of a frontal collision, the rear-facing seated occupant inertially moves toward the vehicle front side, that is, toward the seatback side (seat rear side), and the energy absorbing portion is deformed due to this inertial movement, and thus kinetic energy of the seated occupant at the time of a frontal collision is absorbed.

In the first aspect, the energy absorbing portion may include an energy absorbing member configured to absorb the energy at the time of the frontal collision by being plastically deformed, and the energy absorbing member is disposed on the back surface of the seatback pad within a range that includes an upper region including a position corresponding to a center of gravity of a chest of a seated occupant, and a lower region including a position corresponding to a center of gravity of a waist of the seated occupant.

According to the above configuration, at the time of a frontal collision, the back of the chest of the seated occupant is supported by the rear surface of the vehicle-side vertical wall via the seatback pad and the upper region of the energy absorbing member, and the waist of the seated occupant is supported by the rear surface of the vehicle-body-side vertical wall via the seatback pad and the lower region of the energy absorbing member. Then, the region including the upper region and the lower region of the energy absorbing member is plastically deformed due to the inertial movement of the seated occupant, whereby kinetic energy of the seated occupant at the time of a frontal collision is absorbed.

In the first aspect, the energy absorbing portion may be configured to be deformed such that an amount of displacement is greater in a lower portion of a backrest surface of the seatback than in an upper portion of the backrest surface of the seatback when a pressing load of a predetermined value or more is applied to the backrest surface of the seatback from an seated occupant.

According to the above-described configuration, when the rear-facing seated occupant inertially moves toward the seatback side at the time of a frontal collision and a pressing load of a predetermined value or more is applied to the backrest surface of the seatback from the seated occupant side, the energy absorbing portion is deformed such that the amount of displacement becomes greater in the lower portion of the backrest surface than in the upper portion of the backrest surface. With this configuration, since the posture of the upper body of the seated occupant in the vehicle side view changes so as to approach the vertical posture, upward displacement of the seated occupant along the backrest surface of the seatback is reduced, and the restraint performance of the seated occupant is thus improved.

In the first aspect, the energy absorbing portion may be configured to be deformed such that an amount of displacement is greater in a lower portion of a backrest surface of the seatback than in an upper portion of the backrest surface of the seatback when a pressing load of a predetermined value or more is applied to the backrest surface of the seatback from the seated occupant, and the energy absorbing member may be configured to be plastically deformed such that an amount of displacement is greater in a lower portion of the energy absorbing member than in an upper portion of the energy absorbing member when a pressing load of a predetermined value or more is applied to the backrest surface of the seatback from the seated occupant.

According to the above-described configuration, when the rear-facing seated occupant inertially moves toward the seatback side at the time of a frontal collision and a pressing load of a predetermined value or more is applied to the backrest surface of the seatback from the seated occupant side, the energy absorbing portion is plastically deformed more greatly in the lower portion of the back surface than in the upper portion of the back surface. With this configuration, while improving the restraint performance of the seated occupant, it is possible to preferably absorb kinetic energy of the seated occupant at the time of a frontal collision by the energy absorbing member.

In the above configuration, a hardness in the lower region of the energy absorbing member may be lower than a hardness in the upper region of the energy absorbing member.

According to the above configuration, even with such a simple configuration, the lower region of the energy absorbing member can be plastically deformed more greatly than the upper region of the energy absorbing member at the time of a frontal collision.

In the above configuration, the energy absorbing member may be set such that a surface of the energy absorbing member located on a seating occupant side in a seat side view is inclined toward a seat lower side to the seated occupant side, and a thickness in a seat front-rear direction of the energy absorbing member may be gradually increased from an upper end portion in a seat height direction of the energy absorbing member toward a lower end portion in the seat height direction of the energy absorbing member.

According to the above configuration, even with such a simple configuration, the amount of deformation can be set greater in the lower portion of the energy absorbing member than in the upper portion of the energy absorbing member at the time of a frontal collision.

In the first aspect, side support portions bulging more frontward of the seatback than an intermediate portion of the seatback pad in a seat width direction may be provided on both sides of the seatback pad in the seat width direction, the energy absorbing member may include a bulging portion disposed along a back surface of the seatback pad and disposed inward of the side support portion, and a surface of the energy absorbing member closer to the seated occupant may be set into a shape, in a flat sectional shape of the surface, corresponding to a shape extending from a back surface to side surfaces near the back surface of the seated occupant. The description that "toward a seatback front side" may be considered as a front side in the front-rear direction of the seatback (seat front-rear direction).

According to the above configuration, kinetic energy of the seated occupant is absorbed by the energy absorbing member at the time of a frontal collision, and holding performance of the seated occupant by the seatback is improved by the energy absorbing member at the normal time.

In the above configuration, the energy absorbing member may be integrally molded with the seatback pad.

According to the above configuration, manufacturing is facilitated and cost reduction can be achieved.

In the first aspect, the rear-facing occupant protection device may further include: a pair of side frames that extend in a seatback height direction at respective ends of the seatback in a vehicle width direction; an upper frame coupling upper ends of the pair of side frames to each other; and a holding pipe that couples the pair of side frames and is disposed below the upper frame in the seatback height direction. The energy absorbing portion may include an energy absorbing member that is plastically deformed so as to absorb the energy at the time of the frontal collision, the energy absorbing member may be held in a state of overlapping both the upper frame and the holding pipe from a seat back-surface side in a direction orthogonal to the surface of the seatback, and a reinforcing member that reinforces a part pressed by the energy absorbing member at the time of the frontal collision may be fixed to the vehicle-body-side vertical wall portion.

According to the above configuration, when the rear-facing seated occupant inertially moves toward the seatback side at the time of a frontal collision, the energy absorbing member moves together with the upper frame and the holding pipe toward the vehicle front side, and thus presses the vehicle-body-side vertical wall portion. Here, a part of the vehicle-body-side vertical wall portion pressed by the energy absorbing member is reinforced by the reinforcing member. Accordingly, at the time of a frontal collision, the energy absorbing member is plastically deformed in a preferable manner so as to absorb kinetic energy of the seated occupant at the time of the frontal collision. As a result, an impact applied on the chest of the seated occupant is effectively reduced.

In the first aspect, the rear-facing occupant protection device may further include: a pair of side frames that extend in a seatback height direction on respective sides of the seatback; an upper frame coupling respective upper ends of the pair of side frames to each other; and a holding pipe that couples the pair of side frames and is disposed below the upper frame in the seatback height direction. The energy absorbing portion may include an energy absorbing member configured to be plastically deformed so as to absorb the energy at the time of the frontal collision. The energy absorbing member may be held to a part pressed by the upper frame and the holding pipe at the time of the frontal collision on a rear surface of the vehicle-body-side vertical wall portion in a vehicle front-rear direction, and a reinforcing member that reinforces the vehicle-body-side vertical wall portion may be fixed on an opposite side of the vehicle-body-side vertical wall portion from the energy absorbing member.

According to the above configuration, when the rear-facing seated occupant inertially moves toward the seatback side at the time of a frontal collision, the upper frame and the holding pipe move toward the vehicle front side, and press the rear surface of the vehicle-body-side vertical wall portion. Here, the energy absorbing member is held at a part of the rear surface of the vehicle-body-side vertical wall portion, the part pressed by the upper frame and the holding pipe at the time of a frontal collision, and the reinforcing member for reinforcing the vehicle-body-side vertical wall portion is fixed on the opposite side of the vehicle-body-side vertical wall portion from the energy absorbing member. Accordingly, at the time of a frontal collision, the energy absorbing member is plastically deformed in a preferable manner so as to absorb kinetic energy of the seated occupant at the time of the frontal collision. As a result, an impact applied on the chest of the seated occupant is effectively mitigated.

In the first aspect, the energy absorbing portion may be configured to be deformed such that an amount of displacement is greater in a lower portion of a backrest surface of the seatback than in an upper portion of the backrest surface of the seatback when a pressing load of a predetermined value or more is applied to the backrest surface of the seatback from an seated occupant, and the rear-facing occupant protection device may further includes: a seatback frame to which the seatback pad is held; and a hinge portion couples an upper end of the seatback frame and a first vehicle-body-side component provided on the vehicle-body-side vertical wall portion so as to turnably support the seatback frame about an axis in a seat width direction. The energy absorbing portion may include an elastic member that is interposed between a lower end of the seatback frame and a second vehicle-body-side component so as to urge the lower end of the seatback frame toward the seated occupant, the second vehicle-body-side component being provided below the first vehicle-body-side component.

According to the above configuration, when the rear-facing seated occupant inertially moves toward the seatback side at the time of a frontal collision, the seatback frame turns about the axis of the hinge portion in the seat width direction while an elastic member contracts. At this time, deformation of the elastic member absorbs the kinetic energy of the seated occupant at the time of the frontal collision. Further, at this time, the amount of displacement is greater in the lower portion of the seatback frame than in the upper portion thereof, and the posture of the upper body of the seated occupant in a vehicle side view changes so as to approach the vertical posture; therefore, upward displacement of the seated occupant along the back surface of the seatback is reduced.

In the first aspect, the rear-facing occupant protection device may further include: a three-point seat belt unit applied to the vehicle in which the seatback is mounted in the rear-facing state, the three-point seat belt unit including a retractor configured to wind up a seat belt, the three-point seat belt unit being configured to restrain an upper body of an occupant seated in the rear-facing front seat by a shoulder belt portion configuring a part of the seat belt, and restrain a waist of the occupant by a lap belt portion configuring another part of the seat belt.

According to the above configuration, when the retractor fixed to the vehicle body in the front part of the vehicle winds up the seat belt at the time of a frontal collision, the upper body of the rear-facing seated occupant is restrained by the shoulder belt portion and the waist of the seated occupant is restrained by the lap belt portion at the same time. Therefore, the rear-facing seated occupant can be effectively restrained by the three-point seat belt unit at the time of the frontal collision.

A second aspect of the disclosure provides a rear-facing occupant protection device applied to a vehicle in which a seatback of a vehicle seat is mounted in a rear-facing state or mounted and configured to face rearward. The rear-facing occupant protection device includes: a pair of side frames extended in a height direction of the seatback on respective ends of the seatback in a vehicle width direction; a movable body having an upper end supported to upper portions of the pair of side frames so as to be turnable about an axis in a seat width direction, the movable body including a seatback panel portion supporting a back of a seated occupant; a coupling member disposed on an opposite side of the seatback panel portion from the seated occupant so as to couple the pair of side frames in the seat width direction; and an elastic member interposed between a lower end of the seatback panel portion and the coupling member so as to urge the lower end of the seatback panel portion toward the seated occupant.

According to the above configuration, when the rear-facing seated occupant inertially moves toward the seatback side at the time of a frontal collision, the movable body turns about the axis in the seat width direction while the elastic member contracts. At this time, deformation of the elastic member absorbs kinetic energy of the seated occupant at the time of the frontal collision. In addition, at this time, the amount of displacement of the seatback panel portion is greater in the lower portion of the seatback panel portion than in the upper portion of the seatback panel portion, and the posture of the upper body of the seated occupant in a vehicle side view changes so as to approach the vertical posture. Therefore, upward displacement of the seated occupant is reduced, and restraint performance of the seated occupant is improved.

In the second aspect, the rear-facing occupant protection device may further include a reclining mechanism configured to adjust a tilt angle of the seatback.

According to the above configuration, since the reclining mechanism is provided, there is a possibility that the rear-facing seated occupant may tilt slightly in the direction in which the seatback is reclined when the rear-facing seated occupant inertially moves toward the seatback side at the time of a frontal collision. If the seated occupant tilts in the direction where the seatback is reclined, this is disadvantageous in reducing the upward displacement of the seated occupant. However, in the present disclosure, when the rear-facing seat occupant inertially moves toward the seatback side at the time of a frontal collision, the seatback panel portion turns about the axis in the seat width direction while the elastic member contracts; therefore, it is possible to suppress the upper body of the seated occupant in a vehicle side view from tilting toward the front lower side of the vehicle. Accordingly, even if the reclining mechanism is provided, upward displacement of the seated occupant at the time of a frontal collision is reduced.

As described above, according to the rear-facing occupant protection device of the present disclosure, it is possible to exert an excellent effect to sufficiently absorb kinetic energy caused when a rear-facing seated occupant inertially moves toward the vehicle front side at the time of a frontal collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
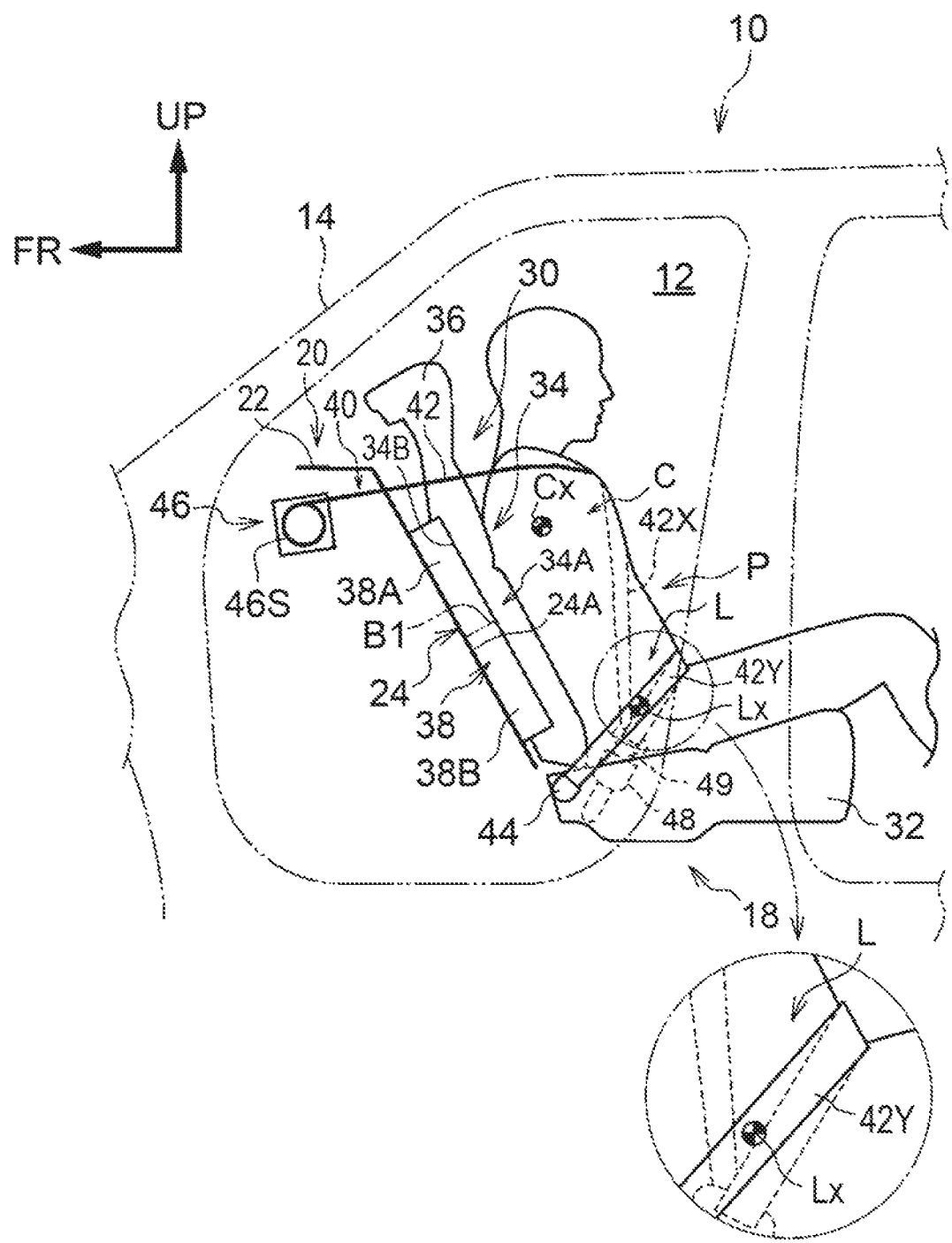
FIG. 1 is a side view showing a rear-facing occupant protection device according to a first embodiment.

A rear-facing occupant protection device according to the first embodiment of the present disclosure will be described with reference to FIG. 1. FIG. 1 is a side view showing a rear-facing occupant protection device 18 according to the present embodiment. In each of the drawings, an arrow FR indicates a front side of the vehicle, and an arrow UP indicates an upper side of the vehicle.

As shown in FIG. 1, a front body panel 20 is disposed on the front end side of a vehicle cabin 12 of a vehicle (automobile) 10, and the front body panel 20 extends along a width direction of the vehicle. The front body panel 20 includes a top wall portion 22 extending from a vicinity of a lower end of a windshield (not shown) disposed between a pair of right and left front pillars 14 toward a rear side of the vehicle along a vehicle front-rear direction. Further, the front body panel 20 is provided with an inclined vertical wall portion 24 as a vehicle-body-side vertical wall portion extending from a rear end of the top wall portion 22 toward a lower rear side of the vehicle.

A rear-facing front seat 30 is mounted rearward of vehicle of the front body panel 20 in a front part of the vehicle cabin 12. The front seat 30 has a seat cushion 32 for supporting the buttocks and thighs of a seated occupant P, and a seatback 34 coupled to an end of the seat cushion 32 located on the rear side in a seat front-rear direction so as to support the back of the seated occupant P, and a headrest 36 coupled to an upper end of the seatback 34 so as to support the head of the seated occupant P.

That is, the vehicle 10 in the present embodiment is an automobile (vehicle) in which the seatback 34 of the front seat 30 is mounted so as to face rearward with the back surface of the seatback 34 facing the inclined vertical wall portion 24 of the front body panel 20.

In FIG. 1, a dummy P for a collision test is seated in the front seat 30 in place of an actual occupant. This dummy P is an AM50 (50 percentile of American adult males). Hereinafter, for easiness of description, the dummy P seated in the front seat 30 in a rear-facing state is referred to as a "seated occupant P".

The seatback 34 includes a seatback pad 34A configuring an elastically deformable cushion portion, and a seat skin (not shown) covering the seatback pad 34A. The seatback pad 34A is formed of foam, such as urethane foam.

An energy absorbing member 38 configuring an energy absorbing portion is disposed on a back surface 34B of the seatback pad 34A of the seatback 34. This energy absorbing member 38 is disposed in a state of being held between the back surface 34B of the seatback pad 34A and a rear surface 24A of the inclined vertical wall portion 24 (an element also understood as a "body supporting surface"). The energy absorbing member 38 is configured to be elastically deformed so as to absorb energy at the time of a frontal collision. The energy absorbing member 38 is fixed to the back surface 34B of the seatback pad 34A, within a continuous range that includes: an upper region 38A (a region of the energy absorbing member 38 located above a two-dot chain line B1) including a position corresponding to a center of gravity Cx of a chest C of the seated occupant P; and a lower region 38B (a region of the energy absorbing member 38 located below the two-dot chain line B1) including a position corresponding to the center of gravity Lx of the waist L of the seated occupant P. More simply, the lower region 38B may be set as a region in the energy absorbing member 38, the region being located lower than the central portion of the energy absorbing member 38 in the seat height direction of the energy absorbing member 38.

The energy absorbing member 38 is formed of, for example, a hard urethane foam, and is fixed to the seatback pad 34A by being integrally molded (more specifically, integrally foam-molded) with the seatback pad 34A. The energy absorbing member 38 may be formed of expanded polypropylene (EPP). In addition, as another modification, the energy absorbing member 38 may be configured by resin ribs (for example, resin ribs in grid).

Further, a three-point seat belt unit 40 is provided so as to correspond to the above-described front seat 30. The three-point seat belt unit 40 includes a seat belt 42 for restraining the occupant. One end of the seat belt 42 is attached, via an anchor plate 44, to a side portion (side surface portion shown in FIG. 1) of the seat cushion 32 located on one side in the vehicle width direction, and the other end of the seat belt 42 is locked to a spool 46S of a retractor 46. Further, a buckle unit 48 is provided upright on a side portion (side surface portion on the back side in the drawing of FIG. 1) of the seat cushion 32 on the other side in the vehicle width direction. A tongue plate 49 supported with being inserted into an intermediate portion of the seat belt 42 is configured to be engageable with the buckle unit 48.

As described above, in a state where the seat belt 42 is fastened to the seated occupant P (see FIG. 1), the three-point seat belt unit 40 restrains the upper body of the seated occupant P by a shoulder belt portion 42X configuring a part of the seat belt 42, and restrains a waist L of the seated occupant P by a lap belt portion 42Y configuring another part of the seat belt 42.

The retractor 46 of the three-point seat belt unit 40 is fixed to the vehicle body in the front part of the vehicle. As an example, the retractor 46 is disposed inside the front body panel 20 and fixed to a vehicle body frame (not shown), and the seat belt 42 extended from the retractor 46 is inserted through a not-shown belt through-hole of the inclined vertical wall portion 24 to be arranged in the vehicle cabin 12. The retractor 46 is configured to wind up the seat belt 42 by the spool 46S. The axial direction of the spool 46S is disposed along the vehicle width direction. The retractor 46 is always urged in a direction in which the spool 46S winds up the seat belt 42 by a not-shown urging mechanism. The three-point seat belt unit 40 includes a not-shown pre-tensioner. The pre-tensioner operates so as to rotate the spool 46S in a direction where the seat belt 42 is wound up when a not-shown frontal collision detection unit or frontal collision prediction unit detects or predicts a frontal collision of the vehicle 10.

Operation and effects of the above embodiment will be described hereinafter.

In the present embodiment, at the time of a frontal collision, the rear-facing seated occupant P inertially moves toward the vehicle front side, that is, toward the seatback 34 side (seat rear side). At this time, a rear part of the chest C of the seated occupant P is supported on the rear surface 24A of the inclined vertical wall portion 24 via the seatback pad 34A and the upper region 38A of the energy absorbing member 38. In addition, the waist L of the seated occupant P is supported on the rear surface 24A of the inclined vertical wall portion 24 via the seatback pad 34A and the lower region 38B of the energy absorbing member 38. The entire region of the energy absorbing member 38 including the upper region 38A and the lower region 38B is plastically deformed due to inertial movement of the seated occupant P, whereby kinetic energy of the seated occupant P at the time of a frontal collision is absorbed.

As described above, according to the rear-facing occupant protection device 18 of the present embodiment, it is possible to sufficiently absorb kinetic energy caused when the rear-facing seated occupant P inertially moves toward the vehicle front side at the time of a frontal collision.

In the present embodiment, the energy absorbing member 38 is disposed on the back surface 34B of the seatback pad 34A within a continuous range including the position corresponding to the center of gravity Cx of the chest C of the seated occupant P and the position corresponding to the center of gravity Lx of the waist L of the seated occupant P. Therefore, at the time of a frontal collision, a load from the seatback pad 34A can be received in a wide range, and for example, deformation of the chest C of the seated occupant P at the time of the frontal collision can be effectively reduced.

In addition, in the present embodiment, since the energy absorbing member 38 is integrally molded with the seatback pad 34A, which facilities manufacturing and can reduce the cost.

Moreover, in the present embodiment, at the time of a frontal collision, when the retractor 46 fixed to the vehicle body in the front part of the vehicle winds up the seat belt 42, the upper body of the rear-facing seated occupant P is restrained by the shoulder belt portion 42X and the waist L of the seated occupant P is restrained by the lap belt portion 42Y. Therefore, the rear-facing seat occupant P can be effectively restrained by the three-point seat belt unit 40 at the time of a frontal collision.

Second Embodiment

Figure 2:
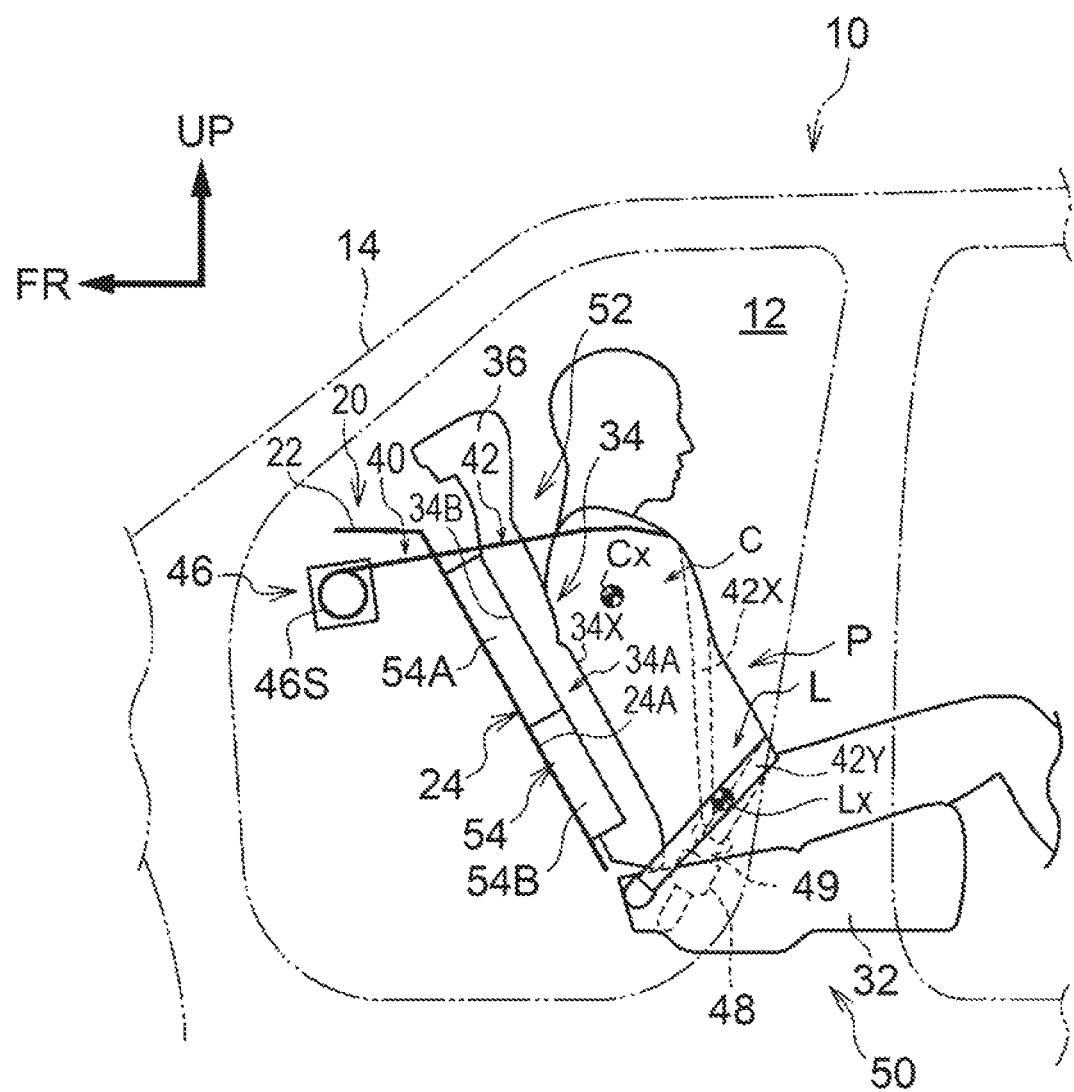
FIG. 2 is a side view showing a rear-facing occupant protection device according to a second embodiment.

Next, a rear-facing occupant protection device according to the second embodiment of the present disclosure will be described with reference to FIG. 2. FIG. 2 is a side view of a rear-facing occupant protection device 50 according to the present embodiment. In the present embodiment, as a member constituting an energy absorbing portion (hereinafter, simply referred to as an "energy absorbing portion") that absorbs energy at the time of a frontal collision by being deformed, provided is an energy absorbing member 54 in place of the energy absorbing member 38 (see FIG. 1), which differs from the rear-facing occupant protection device 18 (see FIG. 1) according to the first embodiment. The other configurations are substantially the same as those of the first embodiment. Therefore, the same reference numerals are added to components substantially the same as those of the first embodiment, and description thereof is omitted.

In the front seat 52, the energy absorbing member 54 is arranged on the back surface 34B of the seatback pad 34A within a continuous range that includes: an upper region 54A including a position corresponding to the center of gravity Cx of the chest C of the seated occupant P; and a lower region 54B including a position corresponding to the center of gravity Lx of the waist L of the seated occupant P. This energy absorbing member 54 is disposed in a state of being held between the back surface 34B of the seatback pad 34A and the rear surface 24A of the inclined vertical wall portion 24. The energy absorbing member 54 is set such that a hardness in the lower region 54B is lower than a hardness in the upper region MA. Such a configuration may be realized by applying materials having different material properties respectively to the upper region 54A and the lower region 54B, or by setting a density to be lower in the lower region 54B than in the upper region 54A.

As a modification of the present embodiment, for example, when the energy absorbing member 54 is configured by resin ribs (resin ribs in grid, for example), the hardness may be set to be lower in lower region 548 than in upper region 54A by changing a plate thickness and a pitch of the resin ribs in each of the lower region 54B and the upper region 54A.

The energy absorbing member 54 is configured to be plastically deformed more greatly in the lower portion of the energy absorbing member 54 than in the upper portion of the energy absorbing member 54 when a pressing load of a predetermined value or more acts on a backrest surface 34X of the seatback 34 from the seated occupant P side. In other words, in the energy absorbing member 54, the amount of displacement becomes greater in the lower portion of the backrest surface 34X of the seatback 34 than in the upper portion of the backrest surface 34X of the seatback 34 when a pressing load of the predetermined value or more acts on the backrest surface 34X from the seated occupant P side.

According to the configuration of the present embodiment, as in the first embodiment, when the rear-facing seated occupant P inertially moves toward the seatback 34 side at the time of a frontal collision, a pressing load of a predetermined value or more acts on the backrest surface 34X of the seatback 34 from the seated occupant P side. In this case, the energy absorbing member 54 is plastically deformed more greatly in the lower portion than in the upper portion. In other words, the energy absorbing member 54 is deformed in such a manner that the amount of displacement becomes greater in the lower portion of the backrest surface 34X of the seatback 34 than in the upper portion of the backrest surface 34X. As a result, the posture of the upper body of the seated occupant P in a vehicle side view changes so as to approach the vertical posture (so as to decrease the torso angle). For this reason, upward displacement of the seated occupant P along the backrest surface 34X of the seatback 34 is reduced, thereby improving the restraint performance of the seated occupant P, and kinetic energy of the seated occupant P at the time of a frontal collision can be thus absorbed by the energy absorbing member 54 in a preferable manner.

Third Embodiment

Figure 3A:
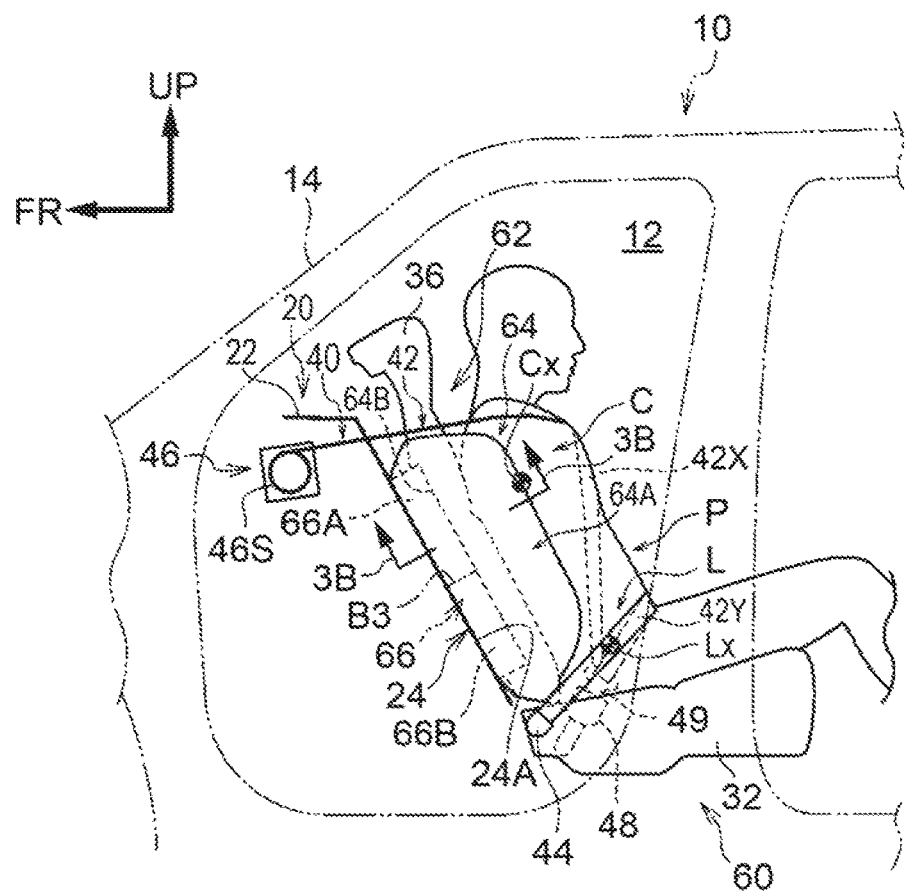
FIG. 3A is a side view showing a rear-facing occupant protection device according to a third embodiment.
Figure 3B:
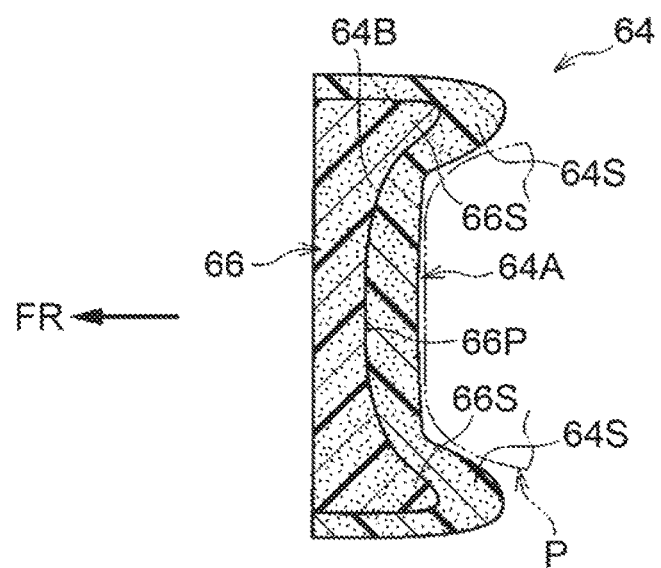
FIG. 3B is an enlarged sectional view taken along line IIIB-IIIB in FIG. 3A.

Next, a rear-facing occupant protection device according to the third embodiment of the present disclosure will be described with reference to FIGS. 3A, 3B. FIG. 3A is a side view showing a rear-facing occupant protection device 60 according to the present embodiment, and FIG. 3B is an enlarged sectional view taken along line IIIB-IIIB in FIG. 3A. In addition, the same reference numerals are added to substantially the same components as those of the first embodiment, and description thereof is omitted.

As shown in FIG. 3A, in a front seat 62 of the present embodiment, in place of the seatback pad 34A (see FIG. 1) of the first embodiment, a seatback pad 64A is provided. A seatback 64 provided with the seatback pad 64A is mounted in a rear-facing state, as in the case of the seatback 34 (see FIG. 1) of the first embodiment. As shown in FIG. 3B, side support portions 64S bulging more frontward of the seatback than an intermediate portion in the seat width direction of the seatback pad 64A are provided on both sides in the seat width direction of the seatback pad 64A.

Further, in the present embodiment, in place of the energy absorbing member 38 (see FIG. 1) in the first embodiment, an energy absorbing member 66 configuring an energy absorbing portion is provided. As an example, the energy absorbing member 66 is made of the same hard urethane foam as that of the energy absorbing member 38 (see FIG. 1) in the first embodiment. As shown in FIG. 3A, the energy absorbing member 66 is fixed to a back surface 64B of the seatback pad 64A, within a continuous range that includes: an upper region 66A (a region of the energy absorbing member 66 located above a two-dot chain line B3) including a position corresponding to the center of gravity Cx of the chest C of the seated occupant P; and a lower region 66B (a region of the energy absorbing member 66 located below the two-dot chain line B3) including a position corresponding to the center of gravity Lx of the waist L of the seated occupant P. This energy absorbing member 66 is disposed in a state of being held between the back surface 64B of the seatback pad 64A and the rear surface 24A of the inclined vertical wall portion 24.

As shown in FIG. 3B, the energy absorbing member 66 includes a bulging portion 66S disposed along the back surface 6411 of the seatback pad 64A and disposed inward of the side support portion 64S of the seatback pad 64A. A surface 66P of the energy absorbing member 66 closer to the seated occupant P (see FIG. 3A) is set into a shape, in a flat sectional shape of the surface 66P, corresponding to a shape extending from the back surface to the side surfaces closer to the back surface of the seating occupant P (a shape indicated by a two-dot chain line in FIG. 3B).

According to the present embodiment, the same operation and effect as those of the above-described first embodiment can be obtained, and the holding performance of the seated occupant P by the seatback 64 can be improved by the energy absorbing member 66 under normal conditions.

Fourth Embodiment

Figure 4:
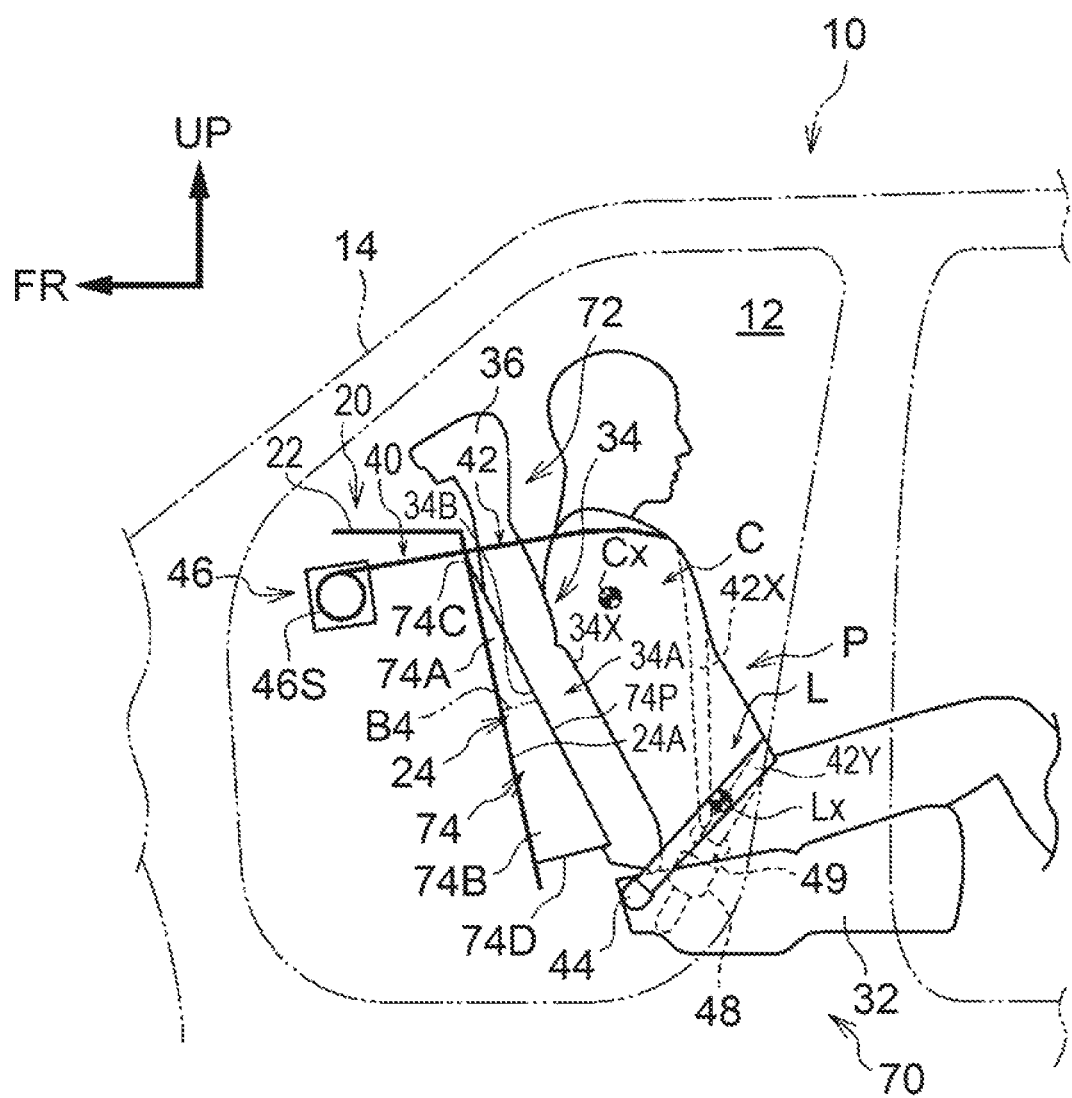
FIG. 4 is a side view showing a rear-facing occupant protection device according to a fourth embodiment.

Next, a rear-facing occupant protection device according to the fourth embodiment of the present disclosure will be described with reference to FIG. 4. FIG. 4 is a side view showing a rear-facing occupant protection device 70 according to the present embodiment. As shown in this drawing, the rear-facing occupant protection device of the present embodiment is different from the rear-facing occupant protection device 18 (see FIG. 1) according to the first embodiment in that an energy absorbing member 74 configuring an energy absorbing portion is provided, in place of the energy absorbing member 38 (see FIG. 1). The other configurations are substantially the same as those of the first embodiment. Therefore, the same reference numerals are added to substantially the same components as those of the first embodiment, and description thereof is omitted.

In the front seat 72, for example, the energy absorbing member 74 is formed of the same hard urethane foam as that of the energy absorbing member 38 (see FIG. 1) in the first embodiment. The energy absorbing member 74 is fixed to the back surface 34B of the seatback pad 34A, within a continuous range that includes: an upper region 74A (a region of the energy absorbing member 74 located above a two-dot chain line B4) including a position corresponding to the center of gravity Cx of the chest C of the seated occupant. P; and a lower region 74B (a region of the energy absorbing member 74 located below the two-dot chain line B4) including a position corresponding to the center of gravity Lx of the waist L of the seated occupant P. The energy absorbing member 74 is disposed in a state of being held between the back surface 34B of the seatback pad 34A and the rear surface 24A of the inclined vertical wall portion 24. The energy absorbing member 74 is set such that a surface 74P closer to the seating occupant P is inclined downward of the seat toward the seating occupant P side, in a seat side view, and the thickness in the seat front-rear direction is gradually thicker from an upper end portion 74C in the seat height direction toward a lower end portion 74D in the seat height direction.

The energy absorbing member 74 is set to be elastically deformed more greatly in a lower portion of the energy absorbing member 74 than in a upper portion of the energy absorbing member 74 when a pressing load of a predetermined value or more acts on the backrest surface 34X of the seatback 34 from the seated occupant P side. In other words, when a pressing load of a predetermined value or more acts on the backrest surface 34X of the seatback 34 from the seated occupant P side, the energy absorbing member 74 is deformed such that the amount of displacement is greater in the lower portion than in the upper portion of the backrest surface 34X.

According to the configuration of the present embodiment, substantially the same operation and effect as those of the second embodiment can be obtained. In addition, this configuration also contributes to improvement of the ride down effect.

Fifth Embodiment

Figure 5:
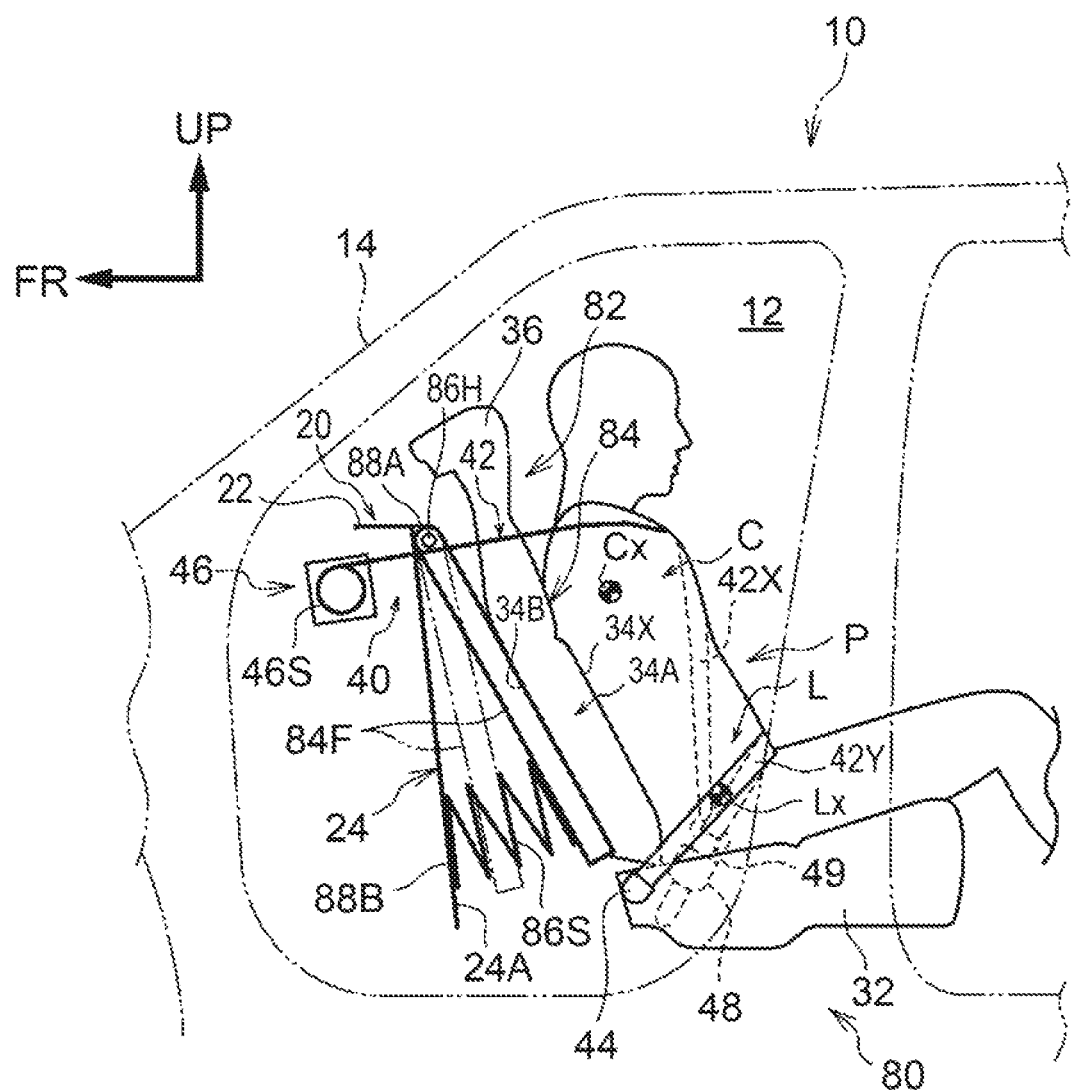
FIG. 5 is a side view showing a rear-facing occupant protection device according to a fifth embodiment.

Next, a rear-facing occupant protection device according to the fifth embodiment of the present disclosure will be described with reference to FIG. 5. FIG. 5 is a side view showing a rear-facing occupant protection device 80 according to the present embodiment. The same reference numerals are added to substantially the same components as those of the first embodiment, and description thereof is omitted.

In the front seat 82 of the present embodiment, the seatback 84 includes a seatback frame 84F on the back surface 34B side of the seatback pad 34A. As an example, the seatback frame 84F is a frame-like member. The seatback pad 34A is held to the seatback frame 84F.

A hinge portion 86H is provided to an upper end of the seatback frame 84F. The hinge portion 86H couples the upper end of the seatback frame 84F and a first vehicle-body-side component 88A provided on the inclined vertical wall portion 24 so as to support and allow the seatback frame 84F to be turnable about the axis in the seat width direction. The seatback frame 84F indicated by a two-dot chain line shows a state in which the seatback frame 84F is turned in the vehicle forward direction by a predetermined angle from a position of the seatback frame 84F indicated by a solid line. As an example, the first vehicle-body-side component 88A is configured by a reinforcement fixed to the upper end of the inclined vertical wall portion 24.

Springs 86S as an elastic member are provided to a lower end of the seatback frame 84F. The springs 86S are compression coil springs in the present embodiment, and are provided in pair on the right and left of the seat width direction, for example. The pair of right and left springs 86S are interposed between the lower end of the seatback frame 84F and a second vehicle-body-side component 88B provided below the first vehicle-body-side component 88A, and urges the lower end of the seatback frame 84F toward the seated occupant P side. In the present embodiment, the second vehicle-body-side component 88B is a part of the lower end of the inclined vertical wall portion 24, for an example. A surface of the second vehicle-body-side component 88B located on the vehicle front side may be reinforced by a reinforcing member.

In the present embodiment, the spring 86S configures an energy absorbing portion. That is, the springs 86S are disposed between the back surface 34S of the seatback pad 34A of the seatback 84 and the rear surface 24A of the inclined vertical wall portion 24, and becomes deformed to absorb energy at the time of a frontal collision.

According to the present embodiment, when the rear-facing seated occupant P inertially moves toward the seatback 84 at the time of a frontal collision, the seatback frame 84F turns about the axis of the hinge portion 8611 in the seat width direction while the springs 86S contract. At this time, deformation of the spring 86S absorbs kinetic energy of the seated occupant P at the time of the frontal collision. In addition, at this time, the amount of displacement is greater in the lower portion of the seatback frame 84F than in the upper portion thereof, and thus the posture of the upper body of the seated occupant P in a vehicle side view changes so as to approach the vertical posture; therefore, upward displacement of the seated occupant P along the backrest surface 34X of the seatback 84 is reduced. In addition, in the present embodiment, this configuration also contributes to improvement of the ride down effect.

Sixth Embodiment

Figure 6A:
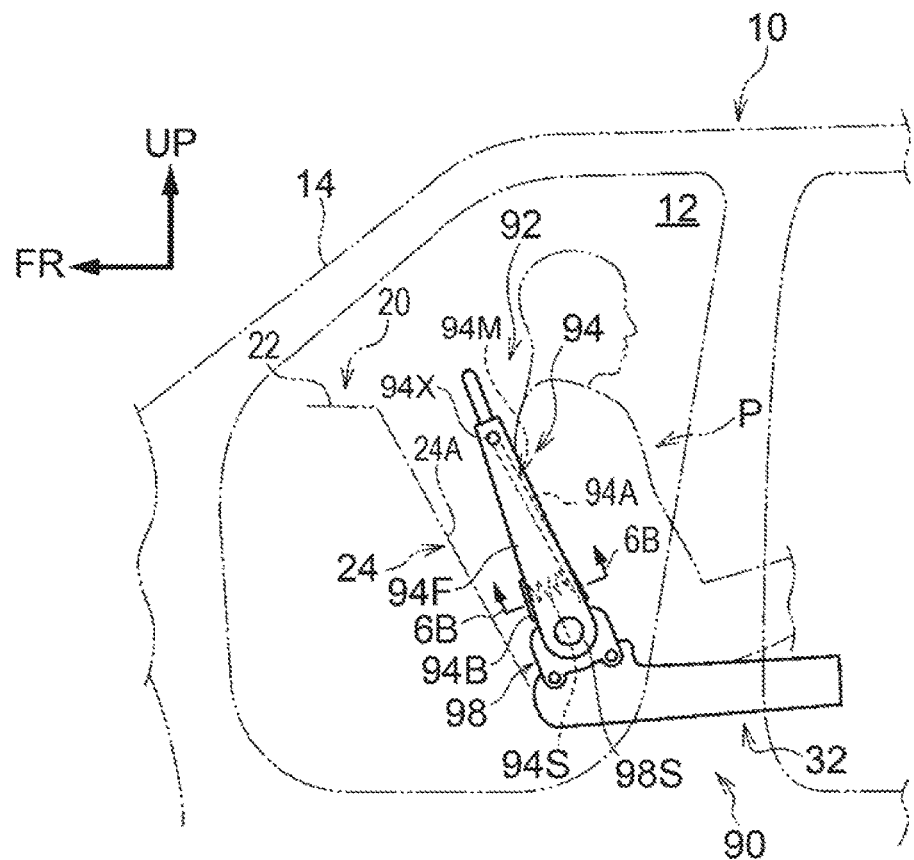
FIG. 6A is a side view showing major parts, etc. of a rear-facing occupant protection device according to a sixth embodiment.
Figure 6B:
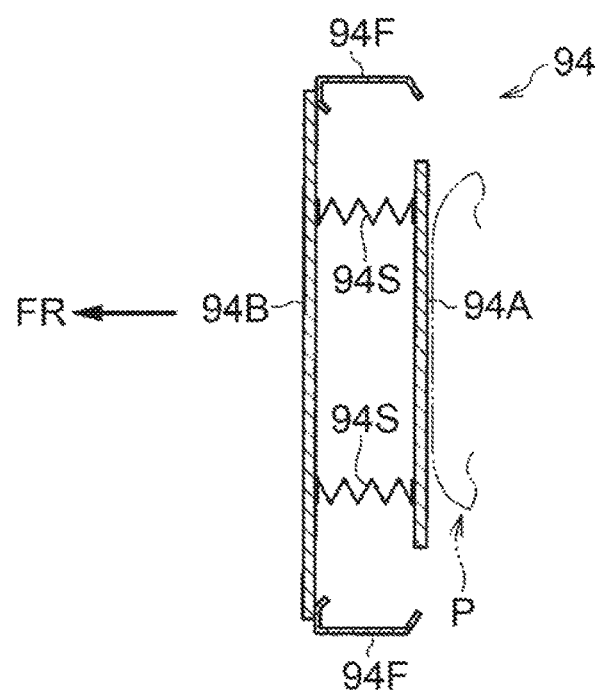
FIG. 6B is an enlarged sectional view taken along line VIB-VIB of FIG. 6A.
Figure 7:
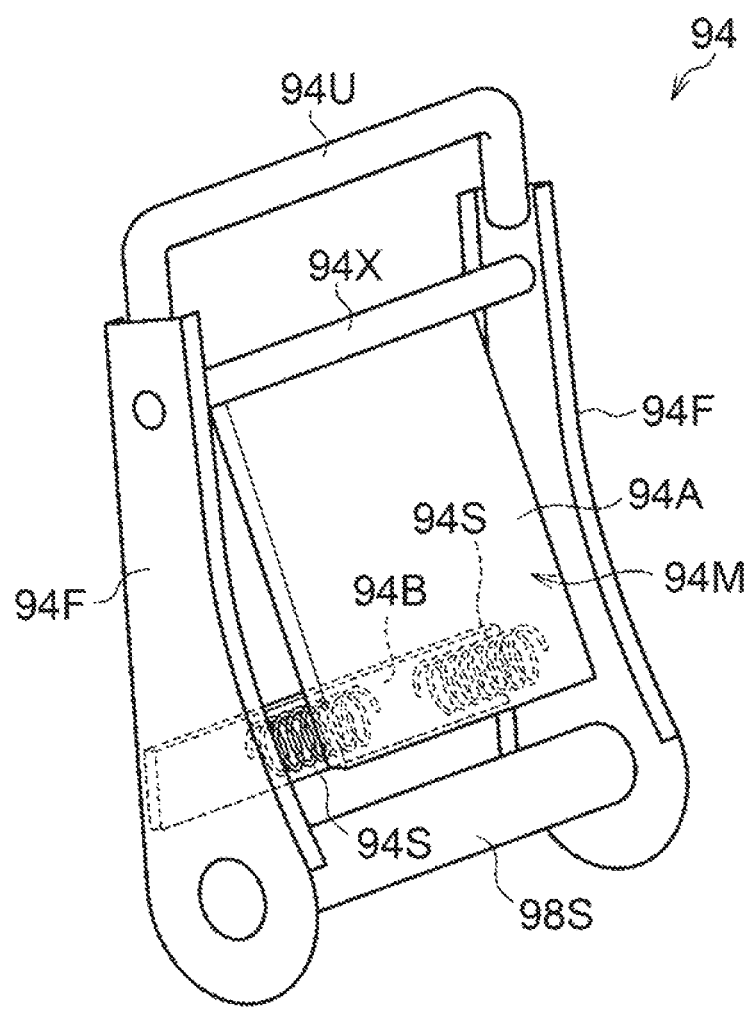
FIG. 7 is a perspective view showing major parts of the rear-facing occupant protection device according to the sixth embodiment.

Next, a rear-facing occupant protection device according to the sixth embodiment of the present disclosure will be described with reference to FIGS. 6A, 6B and FIG. 7. FIG. 6A is a side view showing major parts and others of a rear-facing occupant protection device 90 according to the present embodiment, and FIG. 6B is an enlarged cross-sectional view taken along line VIB-VIB of FIG. 6A. Further, FIG. 7 is a perspective view showing the major parts of the rear-facing occupant protection device 90 according to the sixth embodiment. The same reference numerals are added to substantially the same components as those of the first embodiment, and description thereof is omitted.

As shown in FIG. 6A, a seatback 94 of a vehicle seat 92 (hereinafter referred to simply as a "seat 92") is mounted in a rear-facing state in the vehicle 10. In FIGS. 6A, 6B and FIG. 7 show only skeleton parts of the seat 92, and illustration of the pad and others is omitted. In the present embodiment, as an example, the seat 92 is a front seat, but the seat 92 may be a second seat (seat located in a second row) of seats in three rows. Further, the rear-facing occupant protection device 90 of the present embodiment has a reclining mechanism 98 capable of adjusting a tilt angle of the seatback 94. A reclining mechanism having a known configuration is adopted as this reclining mechanism 98; therefore, detailed description is omitted.

On the other hand, as shown in FIG. 7, the seatback 94 includes a pair of right and left side frames 94F that extend in the seatback height direction on both sides of the seatback 94. Respective upper ends of the right and left side frames 94F in pair are coupled to each other by an upper frame 94U formed in a reverse U-shape in a seatback front view. Respective lower portions of the right and left side frames 94F are coupled to each other by a reclining rod 98S. Then, the seatback 94 is configured to be able to recline about the axis of the reclining rod 98S.

An upper end of a movable body 94M is supported to upper portions of the pair of right and left side frames 94F so as to be turnable about the axis in the seat width direction. The movable body 94M includes: a shaft 94X configuring an upper end of the movable body 94M and extended in the seat width direction; and a plate-like seatback panel portion 94A extended from the shaft 94X toward the seat lower side. The shaft 94X is turnably suspended across the pair of right and left side frames 94F, and the seatback panel portion 94A supports the back of the seated occupant P (see FIG. 6A). Further, a plate-like coupling member 94B is disposed on the opposite side of the seatback panel portion 94A from the seated occupant P. As shown in FIG. 6B, the coupling member 94B couples respective lower portions of the pair of the right and left side frames 94F in the seat width direction.

As shown in FIG. 6B and FIG. 7, springs 94S as an elastic member are interposed between the lower end of the seatback panel portion 94A and the coupling member 94B. The springs 94S are compression coil springs in the present embodiment, and are provided, for example, in pair on the right and left sides in the seat width direction. One ends of the springs 94S are fixed to the lower end of the seatback panel 94A and the other ends thereof are fixed to the coupling members 94B, and the lower end of the seatback panel 94A is urged toward the seated occupant P (see FIG. 6A) side.

According to the configuration of the present embodiment, when the rear-facing seated occupant P shown in FIG. 6A inertially moves toward the seatback 94 side at the time of a frontal collision, the movable body 94M turns about the axis in the seat width direction while the springs 94S contract. At this time, deformation of the springs 94S absorbs kinetic energy of the seated occupant P at the time of the frontal collision. Further, at this time, the amount of displacement is greater in the lower portion of the seatback panel portion 94A than in the upper portion thereof, and the posture of the upper body of the seated occupant P in a vehicle side view changes so as to approach the vertical posture. Accordingly, upward displacement of the seated occupant P is reduced, and restraint performance of the seated occupant P is improved; therefore, the kinetic energy of the seated occupant P at the time of a frontal collision is favorably absorbed by the deformation of the springs 94S.

On the other hand, in the present embodiment, since the rear-facing occupant protection device 90 has the reclining mechanism 98, when the rear-facing seated occupant P inertially moves toward the seatback 94 side at the time of a frontal collision, there is a possibility that the seatback 94 may slightly tilt in a reclining direction. If the seatback 94 tilts in the reclining direction, this is disadvantageous in reducing the upward displacement of the seated occupant P. However, in the present embodiment, as described above, when the rear-facing seated occupant P inertially moves toward the seatback 94 side at the time of a frontal collision, the seatback panel portion 94A turns about the axis in the seat width direction while the springs 94S contract; therefore, it is possible to suppress the upper body of the seated occupant P in a vehicle side view from tilting toward the front lower side of the vehicle. Therefore, even if the reclining mechanism 98 is provided, upward displacement of the seated occupant P at the time of a frontal collision is reduced.

Seventh Embodiment

Figure 8A:
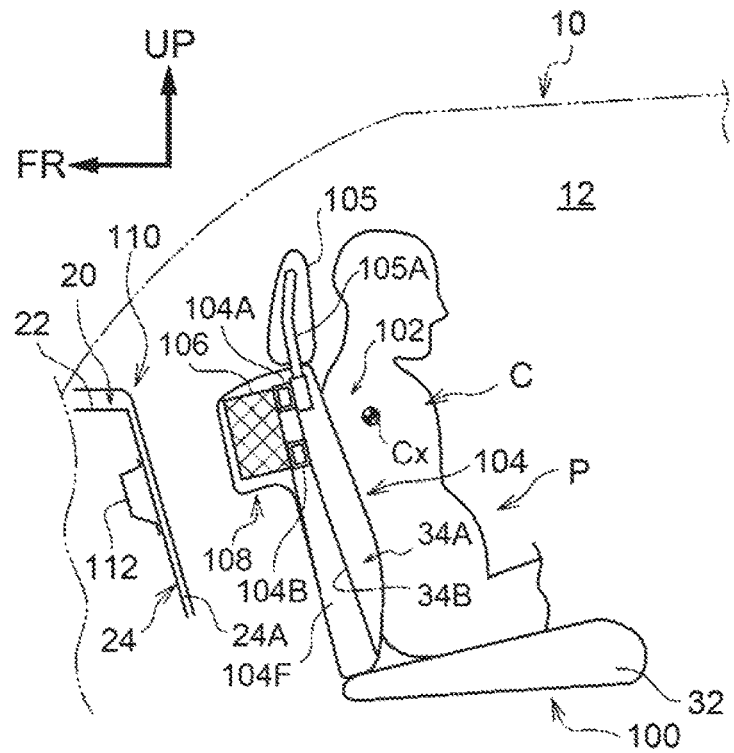
FIG. 8A is a side view showing a rear-facing occupant protection device according to a seventh embodiment.
Figure 8B:
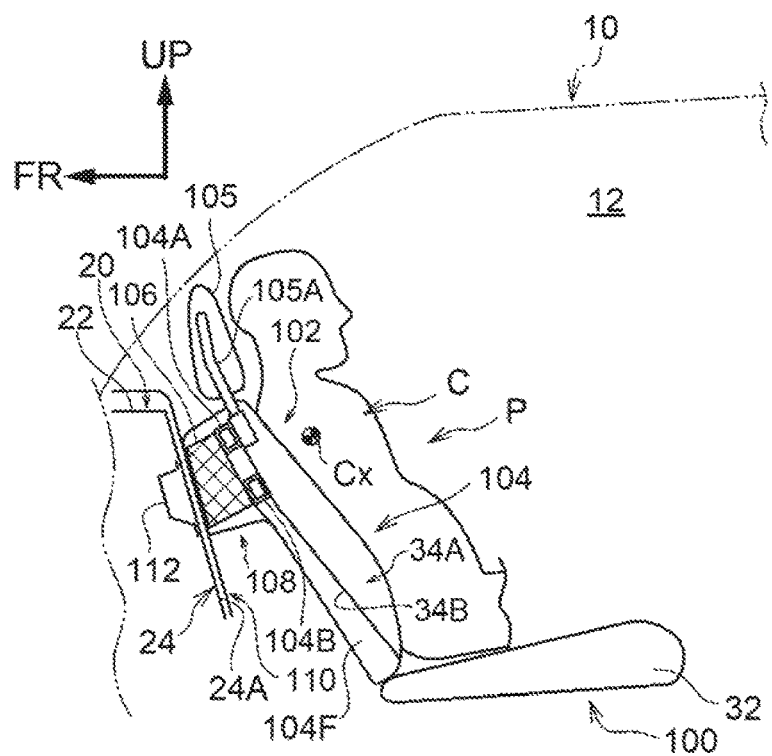
FIG. 8B is a side view showing a state of the rear-facing occupant protection device according to the seventh embodiment at the time of a frontal collision.

Next, a rear-facing passenger protection device according to the seventh embodiment of the present disclosure will be described with reference to FIGS. 8A, 8B. FIG. 8A is a side view showing a rear-facing occupant protection device 100 according to the present embodiment, and FIG. 8B is a side view showing a state of the rear facing occupant protection device 100 at the time of a frontal collision. In FIGS. 8A, 8B, components inside the front seat 102 are simply illustrated in a sectional view showing a state in which an intermediate portion of the front seat 102 in the seat width direction is cut along the seat height direction, as viewed from the seat side. The same reference numerals are added to substantially the same components as those of the first embodiment, and description thereof is omitted.

The front seat 102 of the present embodiment shown in FIG. 8A includes a pair of right and left side frames 104F that extend in the seatback height direction on both sides of the seatback 104. Upper ends of the pair of right and left side frames 104F are coupled to each other in the seat width direction by an upper frame 104A. A headrest stay 105A is attached to the upper frame 104A, and the seatback 104 and the headrest 105 are coupled to each other in the seat height direction by the headrest stay 105A. In addition, a holding pipe 104B that couples the pair of right and left side frames 104F in the seat width direction is disposed below the upper frame 104A in the height direction of the seatback. The holding pipe 104B is disposed in an upper portion of the seatback 104. The upper frame 104A and the holding pipe 104B each have a rectangular cross-sectional shape in a side view of the seat.

An energy absorbing member 106 configuring an energy absorbing portion is disposed on rear surfaces of the upper frame 104A and the holding pipe 104B. An upper portion of the energy absorbing member 106 is fixed to the upper frame 104A by an adhesive, and a lower portion of the energy absorbing member 106 is fixed to the holding pipe 104B by an adhesive. Thus, the energy absorbing member 106 is held in a state of overlapping both the upper frame 104A and the holding pipe 104B from the seat back-surface side, and the energy absorbing member 106 is disposed on an upper portion of the back surface 34B of the seatback pad 34A of the seatback 104 via the upper frame 104A and the holding pipe 104B. In addition, the energy absorbing member 106 is set in a chest corresponding region including the position corresponding to the center of gravity Cx of the chest C of the seated occupant P. As an example, this energy absorbing member 106 is made of an aluminum alloy, and is formed in a structure (e.g. a honeycomb structure) including a porous material that absorbs energy at the time of a frontal collision as the energy absorbing member 106 by plastically deformation. A portion of the seatback 104 to which the energy absorbing member 106 is provided is a protrusion 108 that protrudes toward the rear side in the front-rear direction of the seatback.

On the other hand, the inner side of the vehicle cabin 12 of the front body panel 20 is covered with a lining material 110. Further, a bracket 112 as a reinforcing member for reinforcing a part pressed by the energy absorbing member 106 at the time of a frontal collision is joined (fixed) to a vehicle front portion of the inclined vertical wall portion 24 of the front body panel 20 by welding or the like. For supplemental description, the bracket 112 is extended along the vehicle width direction and is set at a position corresponding to a part where the energy absorbing member 106 presses the inclined vertical wall portion 24 when the seatback 104 moves toward the vehicle front side while tilting toward the vehicle front side by the reclining mechanism at the time of a frontal collision (see FIG. 8B). The bracket 112 is formed in a substantially hat-like shape having an opening directed toward the vehicle rear side in a vehicle side view. Upper and lower flange portions of the bracket 112 are joined to the inclined vertical wall portion 24 so as to form a closed cross-sectional portion extending along the vehicle width direction.

In the present embodiment, when the rear-facing seat occupant P inertially moves toward the vehicle front side at the time of a frontal collision, as shown in FIG. 8B, the seatback 104 moves toward the vehicle front side while tilting toward the front side of the seat, and then, the protrusion 108 abuts against the rear surface 24A of the inclined vertical wall portion 24 via the listing material 110. Then, plastic deformation of the energy absorbing member 106 absorbs kinetic energy of the seated occupant P at the time of the frontal collision. As a result, impact on the chest C of the seated occupant. P is effectively reduced. Further, since the energy absorbing member 106 is provided to the seatback 104, it is possible to cope with an oblique collision without increasing the width of the energy absorbing member 106 for the oblique collision.

Eighth Embodiment

Figure 9:
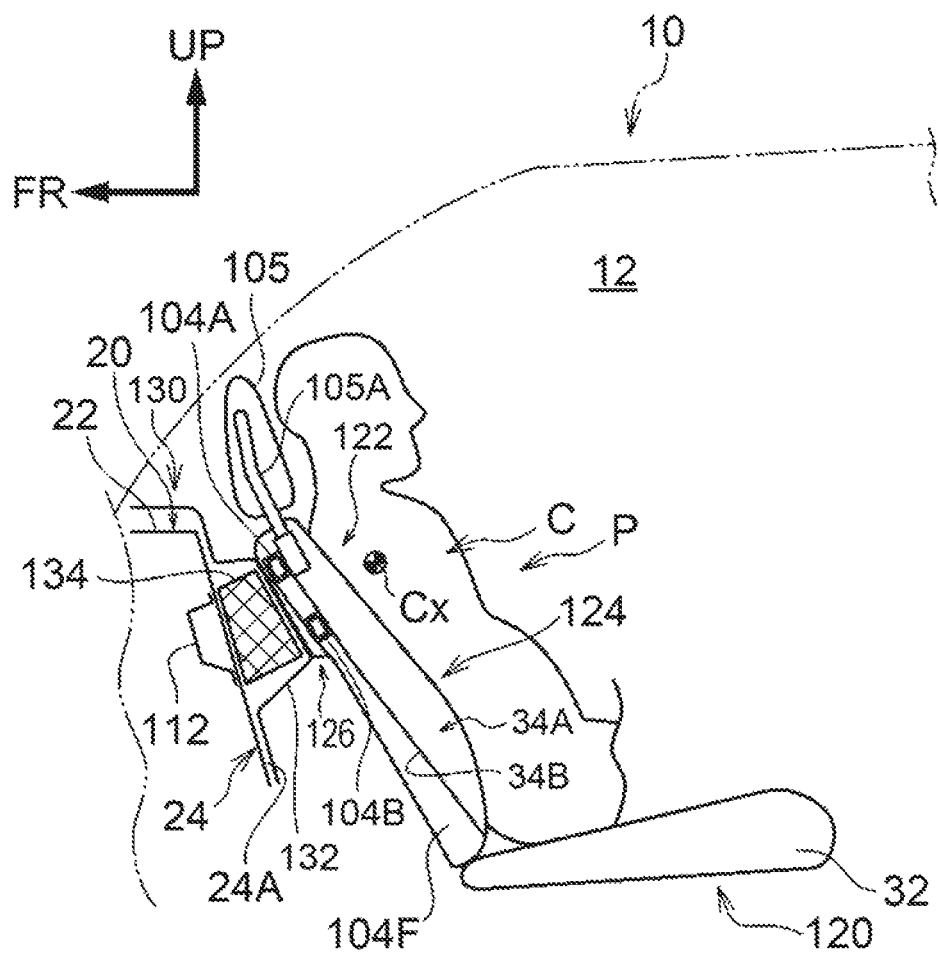
FIG. 9 is a side view showing a state of a rear-facing occupant protection device according to an eighth embodiment at the time of a frontal collision.

Next, a rear-facing occupant protection device according to the eighth embodiment of the present disclosure will be described with reference to FIG. 9. FIG. 9 is a side view showing the rear-facing occupant protection device 120 according to the present embodiment at the time of a frontal collision. In FIG. 9, components inside a front seat 122 are simply illustrated in a sectional view showing a state in which an intermediate portion of the front seat 122 in the seat width direction is cut along the seat height direction, as viewed from the seat side. Further, the posture of the seatback 124 of the front seat 122 in a state before a frontal collision is the same as the posture of the seatback 104 shown in FIG. 8A, as an example. The same reference numerals are added to substantially the same components as those of the first and seventh embodiments, and description thereof is omitted.

In the front seat 122 of the present embodiment shown in FIG. 9, the seatback 124 is not provided with the energy absorbing member 106 (see FIGS. 8A and 8B) in the seventh embodiment, which differs from the seatback 104 of the seventh embodiment. The seatback 124 includes a protrusion 126 that protrudes toward the rear side in the front-rear direction of the seatback, in an upper portion (a chest corresponding region including the position corresponding to the center of gravity Cx of the chest C of the seated occupant P) of the seatback 124 where the upper frame 104A and the holding pipe 104B are disposed.

On the other hand, the inner side of the vehicle cabin 12 of the front body panel 20 is covered with a lining material 130. A portion of the lining material 130 located on the vehicle rear side of the inclined vertical wall portion 24 of the front body panel 20 is formed in a substantially hat-like shape having an opening facing toward the vehicle front side in a vehicle side view, and an intermediate portion of the lining material 130 in the vehicle height direction is set as a protrusion 132 that protrudes toward the vehicle rear side. The protrusion 132 is set at a position where the protrusion 132 is pressed by the upper frame 104A and the holding pipe 104B at the time of a frontal collision (in a state shown in FIG. 9).

An energy absorbing member 134 configuring an energy absorbing portion is disposed between the inclined vertical wall portion 24 of the front body panel 20 and the protrusion 132 of the lining material 130. The energy absorbing member 134 is configured substantially the same as the energy absorbing member 106 in the seventh embodiment, and is a member that absorbs energy at the time of a frontal collision by being plastically deformed. The energy absorbing member 134 is fixed by an adhesive to a portion of the rear surface 24A of the inclined vertical wall portion 24 of the front body panel 20, the portion pressed being pressed by the upper frame 104A and the holding pipe 104B at the time of a frontal collision. In consideration of the movement direction of the seatback 124 at the time of an oblique collision, the protrusion 132 and the energy absorbing member 134 extend not only through the same range in the vehicle width direction as that of the seatback 124 but also to predetermined positions on both sides of the seatback 124. Further, a bracket 112 for reinforcing the inclined vertical wall portion 24 is fixed on the opposite side of the inclined vertical wall portion 24 from the energy absorbing member 134. As an example, the bracket 112 is disposed in the same range in the vehicle width direction as that of the energy absorbing member 134.

In the present embodiment, when the rear-facing seated occupant P inertially moves toward the vehicle front side at the time of a frontal collision, while tilting toward the front side of the seat, the seatback 124 moves toward the vehicle front side, so that the protrusion 126 of the seatback 124 abuts against the protrusion 132 of the lining 130, as shown in FIG. 9. Hence, a load is input from the protrusion 126 of the seatback 124 to the energy absorbing member 134 via the protrusion 132 of the lining material 130, and the energy absorbing member 134 is plastically deformed, thereby absorbing kinetic energy of the seated occupant P at a frontal collision. As a result, an impact on the chest C of the seated occupant P is effectively reduced.

Further, in the present embodiment, the energy absorbing member 134 is disposed on the front body panel 20 side, whereby the mass of the front seat 122 can be reduced. Therefore, an input load from the front seat 122 to the vehicle body side can be reduced.

Supplementary Explanation of Embodiments

In the above embodiment, each of the front seats 30, 52, 62, 72, 82, 102, 122, and the seat 92 is each mounted in the vehicle 10 in a rear-facing state; however, the vehicle seat including the front seat may be mounted in an automobile (vehicle) in such a manner that the vehicle seat is configured to be turnable about the axis extending in the vehicle height direction so as to face rearward.

Although description has been omitted in the second to fourth embodiments, the energy absorbing members 54, 66, 74 are fixed to the seatback pads 34A, 64A by being integrally molded (more specifically, integrally foam-molded) with the seatback pads 34A, 64A, for example. Further, as a modification of the first to fourth embodiments, the energy absorbing member and the seatback pad may be separately formed, and thereafter, they both may be joined to each other with an adhesive or the like.

In the first to fourth embodiments, the energy absorbing members 38, 54, 66, 74 are formed "continuously" in the height direction of the seatback, but the description "a range that includes" set forth in claim 2 is not limited to a single range. For example, the energy absorbing member may include: an upper region including the position corresponding to the center of gravity (Cx) of the chest (C) of the seated occupant (P); and a lower region including the position corresponding to the center of gravity (Lx) of the waist (L) of the seated occupant (P), the upper region and the lower region being divided in the height direction.

In the fifth and sixth embodiments, the springs 86S and 94S as elastic members are compression coil springs. However, as a modification of the fifth and sixth embodiments, the elastic member may be configured by springs other than the compression coil springs, such as springs formed by stacking a plurality of plate springs, or may be a member configured to include springs and rubber.

Further, in the sixth embodiment, the rear-facing occupant protection device 90 includes the reclining mechanism 98, but the rear-facing passenger protection device may be a device including a configuration excluding the reclining mechanism 98 in the configuration of the sixth embodiment.

Moreover, although the illustration of the seat belt unit is omitted in the sixth to eighth embodiments, the seat belt unit is also applied to these embodiments.

Note that the above-described embodiments and the above-described modifications can be implemented in appropriate combinations.

As mentioned above, although an example of the present disclosure was explained, the present disclosure is not limited to the above, and it is needless to mention that other than the above, the present disclosure can be variously modified and carried out without deviating from the gist of the disclosure.

What is claimed is:

1. A rear-facing occupant protection device applied to a vehicle in which a seatback of a front seat is mounted in a rear-facing state in which a back surface of the seatback faces a vehicle-body-side inclined vertical wall portion disposed at a front end of a vehicle cabin, or mounted such that the seat back is capable of taking the rear-facing state, the rear-facing occupant protection device comprising:
   an energy absorbing portion disposed on at least one of a back surface of a seatback pad of the seatback and a rear surface of the vehicle-body-side inclined vertical wall portion, the energy absorbing portion being configured to be deformed so as to absorb energy at a time of a frontal collision of the vehicle,
   wherein the energy absorbing portion is disposed in a state of being held between the back surface of the seatback pad of the seatback and the rear surface of the vehicle-body-side inclined vertical wall portion that constitutes a body supporting surface, the rear surface of the vehicle-body-side inclined vertical wall portion being disposed between the front end of the vehicle cabin and the energy absorbing portion.

2. The rear-facing occupant protection device according to claim 1, wherein the energy absorbing portion includes an energy absorbing member configured to absorb the energy at the time of the frontal collision by being plastically deformed, and the energy absorbing member is disposed on the back surface of the seatback pad within a range that includes an upper region including a position corresponding to a center of gravity of a chest of a seated occupant, and a lower region including a position corresponding to a center of gravity of a waist of the seated occupant.

3. The rear-facing occupant protection device according to claim 2, wherein the energy absorbing portion is configured to be deformed such that an amount of displacement is greater in a lower portion of a backrest surface of the seatback than in an upper portion of the backrest surface of the seatback when a pressing load of a predetermined value or more is applied to the backrest surface of the seatback from the seated occupant, and
   the energy absorbing member is configured to be plastically deformed such that an amount of displacement is greater in a lower portion of the energy absorbing member than in an upper portion of the energy absorbing member when a pressing load of a predetermined value or more is applied to the backrest surface of the seatback from the seated occupant.

4. The rear-facing occupant protection device according to claim 3, wherein a hardness in the lower region of the energy absorbing member is lower than a hardness in the upper region of the energy absorbing member.

5. The rear-facing occupant protection device according to claim 3, wherein the energy absorbing member is set such that a surface of the energy absorbing member located on a seated occupant side in a seat side view is inclined toward a seat lower side to the seated occupant side, and
 a thickness in a seat front-rear direction of the energy absorbing member is gradually increased from an upper end portion in a seat height direction of the energy absorbing member toward a lower end portion in the seat height direction of the energy absorbing member.

6. The rear-facing occupant protection device according to claim 2, wherein side support portions bulging more frontward of the seatback than an intermediate portion of the seatback pad in a seat width direction are provided on both sides of the seatback pad in the seat width direction,
 the energy absorbing member includes a bulging portion disposed along a back surface of the seatback pad and disposed inward of the side support portion, and
 a surface of the energy absorbing member closer to the seated occupant is set into a shape, in a flat sectional shape of the surface, corresponding to a shape extending from a back surface to side surfaces near the back surface of the seated occupant.

7. The rear-facing occupant protection device according to claim 2, wherein the energy absorbing member is integrally molded with the seatback pad.

8. The rear-facing occupant protection device according to claim 1, wherein the energy absorbing portion is configured to be deformed such that an amount of displacement is greater in a lower portion of a backrest surface of the seatback than in an upper portion of the backrest surface of the seatback when a pressing load of a predetermined value or more is applied to the backrest surface of the seatback from era seated occupant.

9. The rear-facing occupant protection device according to claim 1, further comprising:
 a three-point seat belt unit applied to the vehicle in which the seatback is mounted in the rear-facing state, the three-point seat belt unit including a retractor configured to wind up a seat belt, the three-point seat belt unit being configured to restrain an upper body of an occupant seated in the rear-facing front seat by a shoulder belt portion configuring a part of the seat belt, and restrain a waist of the occupant by a lap belt portion configuring another part of the seat belt.

10. A rear-facing occupant protection device applied to a vehicle in which a seatback of a front seat is mounted in a rear-facing state in which a back surface of the seatback faces a vehicle-body-side vertical wall portion disposed at a front end of a vehicle cabin, or mounted such that the seat back is capable of taking the rear-facing state, the rear-facing occupant protection device comprising:
 an energy absorbing portion disposed on at least one of a back surface of a seatback pad of the seatback and a rear surface of the vehicle-body-side vertical wall portion, the energy absorbing portion being configured to be deformed so as to absorb energy at a time of a frontal collision of the vehicle,
 wherein:
 (i) the rear-facing occupant protection device further comprises:
  a pair of side frames that extend in a seatback height direction at respective ends of the seatback in a vehicle width direction,
  an upper frame coupling upper ends of the pair of side frames to each other, and
  a holding pipe that couples the pair of side frames and is disposed below the upper frame in the seatback height direction,
  wherein the energy absorbing portion includes an energy absorbing member that is plastically deformed so as to absorb the energy at the time of the frontal collision,
  the energy absorbing member is held in a state of overlapping both the upper frame and the holding pipe from a seat back-surface side in a direction orthogonal to the surface of the seatback, and
  a reinforcing member that reinforces a part pressed by the energy absorbing member at the time of the frontal collision is fixed to the vehicle-body-side vertical wall portion,
 (ii) the rear-facing occupant protection device further comprises:
  a pair of side frames that extend in a seatback height direction on respective sides of the seatback,
  an upper frame coupling respective upper ends of the pair of side frames to each other, and
  a holding pipe that couples the pair of side frames and is disposed below the upper frame in the seatback height direction,
  wherein the energy absorbing portion includes an energy absorbing member configured to be plastically deformed so as to absorb the energy at the time of the frontal collision,
  the energy absorbing member is held to a part pressed by the upper frame and the holding pipe at the time of the frontal collision on a rear surface of the vehicle-body-side vertical wall portion in a vehicle front-rear direction, and
  a reinforcing member that reinforces the vehicle-body-side vertical wall portion is fixed on an opposite side of the vehicle-body-side vertical wall portion from the energy absorbing member, or
 (iii) the energy absorbing portion is configured to be deformed such that an amount of displacement is greater in a lower portion of a backrest surface of the seatback than in an upper portion of the backrest surface of the seatback when a pressing load of a predetermined value or more is applied to the backrest surface of the seatback from a seated occupant,
  the rear-facing occupant protection device further comprises:
   a seatback frame to which the seatback pad is held, and
   a hinge portion couples an upper end of the seatback frame and a first vehicle-body-side component provided on the vehicle-body-side vertical wall portion so as to turnably support the seatback frame about an axis in a seat width direction,
  wherein the energy absorbing portion includes an elastic member that is interposed between a lower end of the seatback frame and a second vehicle-body-side component so as to urge the lower end of the seatback frame toward the seated occupant, the second vehicle-body-side component being provided below the first vehicle-body-side component.

11. A rear-facing occupant protection device applied to a vehicle in which a seatback of a vehicle seat is mounted in a rear-facing state or mounted and configured to face rearward, the rear-facing occupant protection device comprising:
- a pair of side frames extended in a height direction of the seatback on respective ends of the seatback in a vehicle width direction;
- a movable body having an upper end supported to upper portions of the pair of side frames so as to be turnable about an axis in a seat width direction, the movable body including a seatback panel portion supporting a back of a seated occupant;
- a coupling member disposed on an opposite side of the seatback panel portion from the seated occupant so as to couple the pair of side frames in the seat width direction; and
- an elastic member interposed between a lower end of the seatback panel portion and the coupling member so as to urge the lower end of the seatback panel portion toward the seated occupant.

12. The rear-facing occupant protection device according to claim 11, further comprising a reclining mechanism configured to adjust a tilt angle of the seatback.

\* \* \* \* \*